(12) United States Patent
Kam

(10) Patent No.: US 8,191,858 B2
(45) Date of Patent: Jun. 5, 2012

(54) SOLENOID VALVE HAVING A SHORT AXIS

(75) Inventor: Moochul Kam, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 908 days.

(21) Appl. No.: 12/203,297

(22) Filed: Sep. 3, 2008

(65) Prior Publication Data

US 2009/0283707 A1   Nov. 19, 2009

(30) Foreign Application Priority Data

May 16, 2008 (KR) .................. 10-2008-0045564

(51) Int. Cl.
*F16K 31/02* (2006.01)

(52) U.S. Cl. .................. 251/129.15; 303/119.2

(58) Field of Classification Search ............. 137/315.03, 137/533, 533.11, 544, 545, 550, 599.01, 137/601.14, 601.21; 251/129.15, 129.02; 303/119.2; 335/278
See application file for complete search history.

(56) References Cited

U.S. PATENT DOCUMENTS

| | | | | |
|---|---|---|---|---|
| 3,295,079 A | * | 12/1966 | Brown | 335/255 |
| 5,076,538 A | * | 12/1991 | Mohr et al. | 251/129.18 |
| 5,975,654 A | * | 11/1999 | Zaviska et al. | 303/119.2 |
| 6,189,983 B1 | * | 2/2001 | Volz et al. | 303/119.2 |
| 6,254,199 B1 | * | 7/2001 | Megerle et al. | 303/119.2 |
| 6,364,430 B1 | * | 4/2002 | Park | 303/119.2 |
| 6,627,077 B2 | * | 9/2003 | Fritsch et al. | 210/232 |
| 6,719,267 B2 | * | 4/2004 | Torii et al. | 251/129.15 |
| 6,789,779 B2 | * | 9/2004 | Wilde et al. | 251/129.15 |
| 6,808,160 B2 | * | 10/2004 | Hayakawa et al. | 251/129.02 |
| 2003/0183790 A1 | | 10/2003 | Ji et al. | |
| 2003/0201417 A1 | | 10/2003 | Ahn | |
| 2003/0201418 A1 | | 10/2003 | Ahn | |
| 2004/0011981 A1 | | 1/2004 | Ahn | |
| 2007/0296270 A1 | | 12/2007 | Park | |

FOREIGN PATENT DOCUMENTS

KR   10-2004-0091435   10/2004

OTHER PUBLICATIONS

English language Abstract of KR 10-2004-0091435, Oct. 28, 2004.

* cited by examiner

*Primary Examiner* — Eric Keasel
*Assistant Examiner* — Matthew W Jellett
(74) *Attorney, Agent, or Firm* — Greenblum & Bernstein P.L.C.

(57) ABSTRACT

According to a solenoid valve of the invention, which is fitted in a pump housing, when ABS/TCS/ESP operate, a valve body with a plunger that forms the internal channel with a plunger seat is formed in a simple cylindrical shape to reduce a cycle time and manufacturing cost while a seat housing that is manufactured by pressing, in which a filter and plunger seat forming an internal channel are assembled is fitted in a vale body by staking. Accordingly, a laser welding is not needed and the length of the end portion of valve body is reduced, such that the entire length is reduced and the weigh is reduced as well.

6 Claims, 3 Drawing Sheets

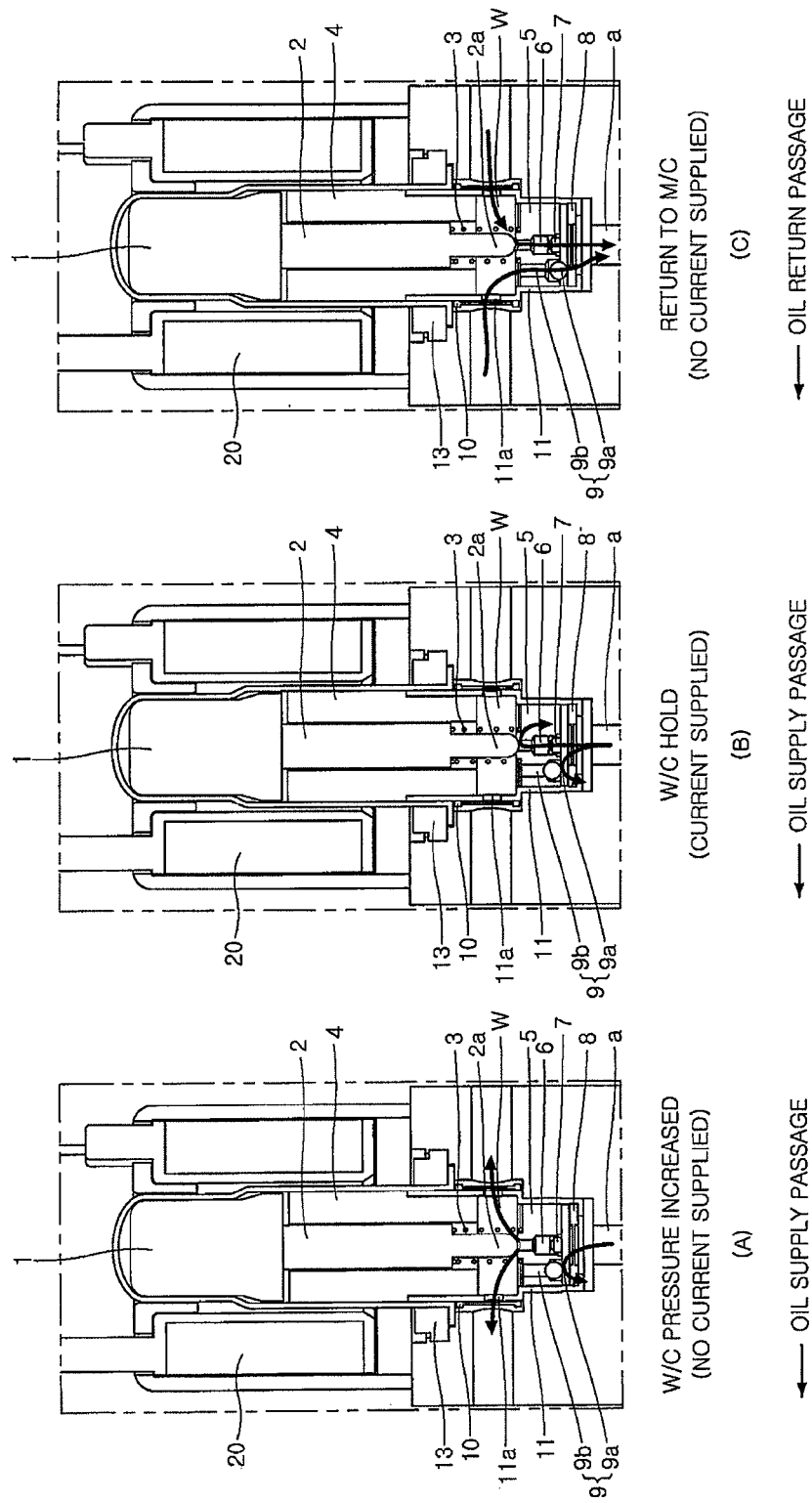

SOLENOID VALVE HAVING A SHORT AXIS

CROSS-REFERENCE TO RELATED APPLICATIONS

The present application is based on, and claims priority from, Korean Application Serial Number 10-2008-0045564, filed on May 16, 2008, the disclosure of which is hereby incorporated by reference herein in its entirety.

FIELD OF THE INVENTION

The present invention relates a solenoid valve, particularly a solenoid valve having a short axis.

BACKGROUND OF THE INVENTION

In general, since a brake system that stops a vehicle that is traveling using hydraulic pressure that increases pedal effort applied to the brake pedal by a driver uses a simple method that holds wheels that are rotating to stop the rotation, it cannot achieve optimum braking performance for traveling conditions of the vehicle and the conditions of the road surface.

In order to overcome limits of the simple brake system as described above, an anti-lock brake system that prevents wheels from locking by appropriately adjusting brake pressure that is applied to the wheels according to a slip ratio that is calculated from the wheels' velocity is used or a traction control system that adjust a driving force of the engine to prevent excessive slip when the vehicle is rapidly started or accelerated is used, in which safety of the vehicle is improved.

However, even in the anti-lock brake system or the traction control system, they can achieve a good performance for a straight road at best, and when the vehicle turns on a curved road, it is impossible to completely control an under steer in which the vehicle is excessively inclined to the outside of the road or an over steer in which the vehicle is excessively inclined to the inside of the road, thereby decreasing reliability of the safety of the vehicle.

For this reason, an EPS (Electronic Stability Program) system, which allows the driver to safely keep the vehicle in a desired direction under any driving condition by minimizing a difference between the traveling direction of the vehicle that the drive wants and the actual traveling direction of the vehicle, in consideration of all of three of braking, driving, and driving systems, that is, by synthetically estimating and controlling the over steer or the under steer in response to measured signals that are inputted from a wheel speed sensor, a yaw rate sensor, a transverse acceleration sensor, and a steering angle sensor, has been used in recent years.

In theses ABS/TCS/ESP systems, separate from a hydraulic (brake) line for supplying hydraulic brake pressure between a master cylinder and the wheels, unexpected turning of the vehicle (e.g. on a ice road) is prevented by pumping oil from the master cylinder and supplying brake pressure to the wheels, in which a solenoid valve is used to provide a oil channel between the master cylinder and a pump.

That is, the solenoid valve is included in a hydraulic circuit in braking, stops the channel or adjusts the increasing speed of hydraulic pressure when the ABS/TCS/ESP is in operation, and operates for rapid release when the braking is released.

However, because the solenoid valve that forms the channel of a liquid pressure line between the master cylinder and the pump should be precisely controlled, the cost is considerably increased by manufacturing of the valve, particularly machining of a valve body that forms the channel and the complicated structure.

Further, because a filter is further needed to filter impurities in the oil, working process and time for assembling the filter is added.

SUMMARY OF THE INVENTION

Embodiments of the present invention reduce a cycle time and manufacturing cost without applying a laser welding for the parts, by manufacturing a valve body, which is included in a solenoid valve that is activated as a part of a hydraulic circuit when ABS/TCS/ESP operate in braking, in a simple shape, and fitting the parts using a staking process.

According to the solenoid valve of the invention, because parts that are involved in a filter for removing impurities in oil and a plunger seat for forming an internal channel are integrally assembled in a housing that is manufactured by pressing while a portion of housing is fitted in the valve body by staking, the entire length of the solenoid valve is reduced and the entire weight is reduced as well.

A solenoid valve having a short axis according to the invention includes a valve body, a cover housing, a seat housing, a front end filter, a return valve, and a circumferential filter.

The valve body pushes a spring when an armature is excited, has a center through hole where a plunger having a channel opening/closing valve extending from the front end is inserted, and has a front body that has an outer circumference that is stepped as compared with the other portion.

The cover housing is disposed inside a coil, has an outer circumference on which a bush, which surrounds the valve body and is fitted, and has a front end flange that is formed at the end and has an enlarged diameter to support the bottom of the bush.

The seat housing is disposed such that the plunger body 5 with a channel hole, which is formed through the center to form a channel and opened/closed by a channel opening/closing valve, forms a channel space with respect to the valve body, has a front end body having a bottom through hole that is communicated with a first channel hole of the pump housing, and has a rear body that has a larger diameter than the front body, has side through holes communicated with second channel hole of the pumping housing, has a staking section at the end that is fitted in a gap formed by the cover housing and the front body of the valve body.

The front end filter is disposed under the plunger seat with an insert that is fitted in the inlet of the channel hole in the front body of the seat housing to remove impurities in oil that flows inside through the bottom through hole of the front body of the seat housing.

The return valve is formed in parallel with the channel hole of the plunger seat at a side of the channel hole and forms a return channel between the first channel hole and the second channel hole of the pump housing as being opened by pressure of the oil that returns from the wheel cylinder.

The circumferential filter surrounds the side through holes of the rear body of the seat housing and filters impurities in the oil.

According to a solenoid valve of the invention, which is fitted in a pump housing, when ABS/TCS/ESP operate, a valve body with a plunger that forms the internal channel with a plunger seat is formed in a simple cylindrical shape to reduce a cycle time and manufacturing cost while a seat housing that is manufactured by pressing, in which a filter and the plunger seat forming an internal channel are assembled is fitted in a vale body by staking. Accordingly, a laser welding is not needed and the length of the end portion of the valve body is reduced, such that the entire length is reduced and the weigh is reduced as well.

BRIEF DESCRIPTION OF THE DRAWINGS

For better understanding of the nature and objects of the present invention, reference should be made to the following detailed description with the accompanying drawings, in which:

FIGS. 3A to 3C are views illustrating the operation of the solenoid valve having a short axis according to the invention.

DETAILED DESCRIPTION OF THE PREFERRED EMBODIMENTS

Figure 1:
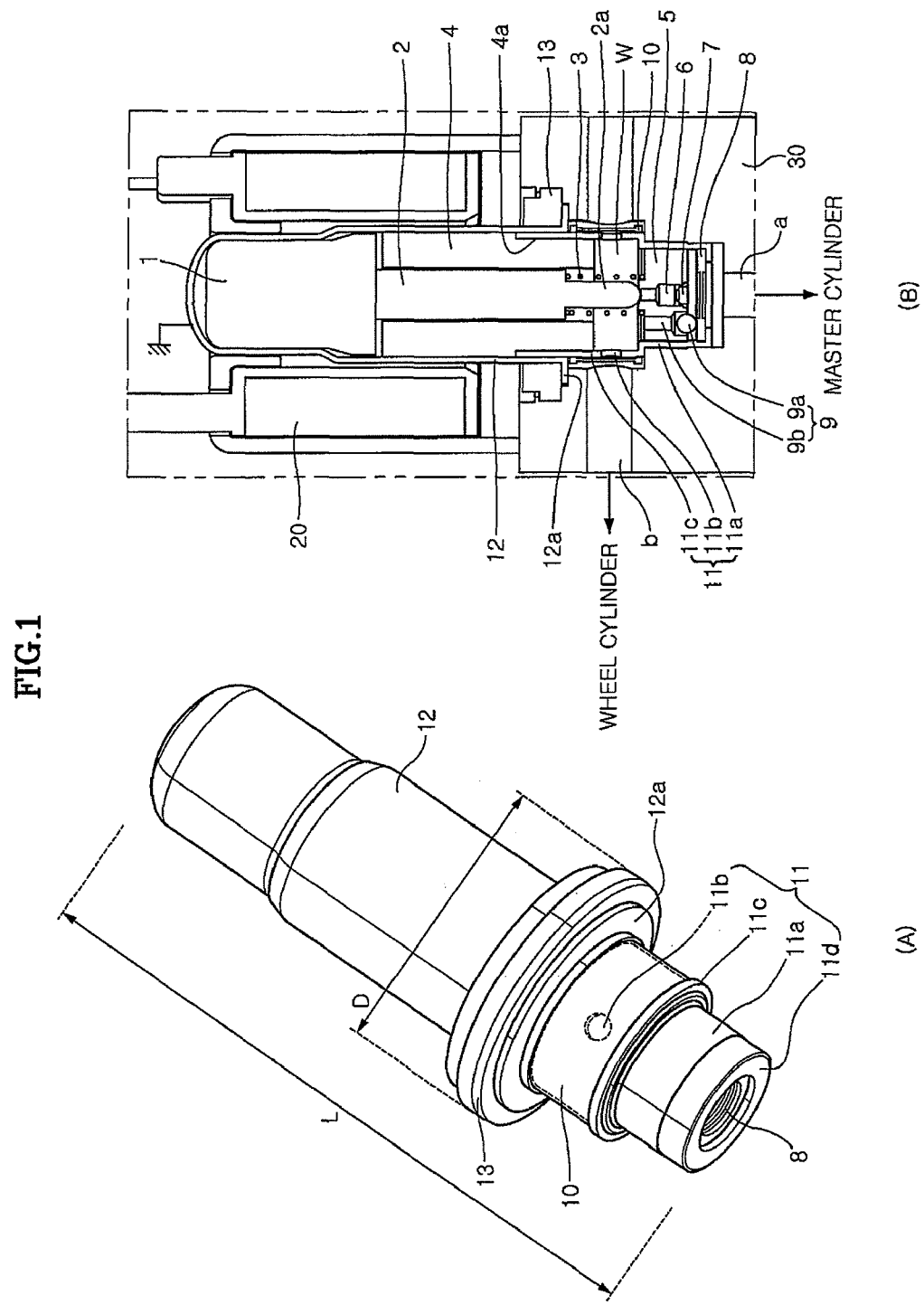
FIGS. 1A and 1B are views illustrating the configuration of a solenoid valve having a short axis according to the invention.

Embodiments of the invention are described hereafter in detail with reference to the accompanying drawings, but theses embodiments are just examples and can be achieved in various modifications by those skilled in the art. Therefore, the present invention is not limited to the embodiments.

FIGS. 1A and 1B show the configuration of a solenoid valve having a short axis according to the invention. The solenoid valve according to the invention is a NO-typed (Normal Open) inlet solenoid valve that is forcibly fitted to first and second channel holes a, b and forms a channel between a master cylinder and a wheel cylinder.

In the solenoid valve, a cover housing 12 accommodates a valve body 4 in which a plunger 2, which closes the channel when an armature 1 surrounded by a coil 20 is excited, is inserted, a bush 13 that is fitted on the outer circumference of cover housing 12 is fitted in a pump housing 30, and a seat housing 11, that is fitted between cover housing 12 and valve body 4 by staking is disposed between first and second channels a, b of pump housing 30.

Further, plunger 2 is provided with a channel opening/closing valve 2a to close the internal channel that is open when armature 1 is excited and channel opening/closing valve 2a is integrally formed with the end of plunger 2 and of which the end is formed in an arc shape and elastically supported by a spring 3.

Further, valve body 4 is manufactured by forging without a change in diameter, has a center hole to insert plunger 2 and of which an front end body 4a that is disposed in pump housing 30 has relatively smaller diameter than the other portion.

The length of front end body 4a is determined such that a sufficient fitting force is secured, in consideration of fitting valve body 4 using staking.

Further, cover housing 12 has a front end flange having an enlarged diameter at an end while accommodating armature 1 and valve body 4, such that when bush 13 placed on front end flange 12a is fitted in pump housing 30, bush 12 presses front end flange 12a and holds cover housing 12.

Bush 13 has a larger diameter than front end flange 12a of cover housing 12, such that it is inserted in pump housing 30 and in close contact with pump housing 30 to generate a large fitting force.

Further, cover housing 12 is surrounded by coil 20.

Further, a plunger seat 5 that is disposed apart from valve body 4 to form a channel space W and an front end filter 8 that supports an insert 7 disposed in the inlet of a channel hole 6 of plunger seat 5 and filters impurities in the oil are sequentially assembled in seat housing 11.

In this configuration, plunger seat 5 has a channel hole 6 that is formed through the center, insert 7 is disposed in the inlet of channel hole 6, and channel opening/closing valve 2a of plunger 2 is in contact with the outlet, in which the outlet of channel hole 6 is cut in an arc shape to correspond to the arc shape at the end of channel opening/closing valve 2a.

Further, front end filter 8 supports a net formed at the center and has an edge having a predetermined width while being disposed behind plunger seat 5.

In addition, plunger seat 5 is provided with a return valve 9 to rapidly return the oil to the master cylinder, return valve 9 has a return channel hole 9b that is formed in parallel with channel hole 6 at a side of channel hole 6 at the center and a ball 9a that is disposed at the outlet of return channel hole 9b and opened/closed by hydraulic pressure transmitted through return channel hole 9b.

Ball 9a is held and supported by front end filter 8 to secure a gap such that return channel hole 9b can be opened.

Figure 2:
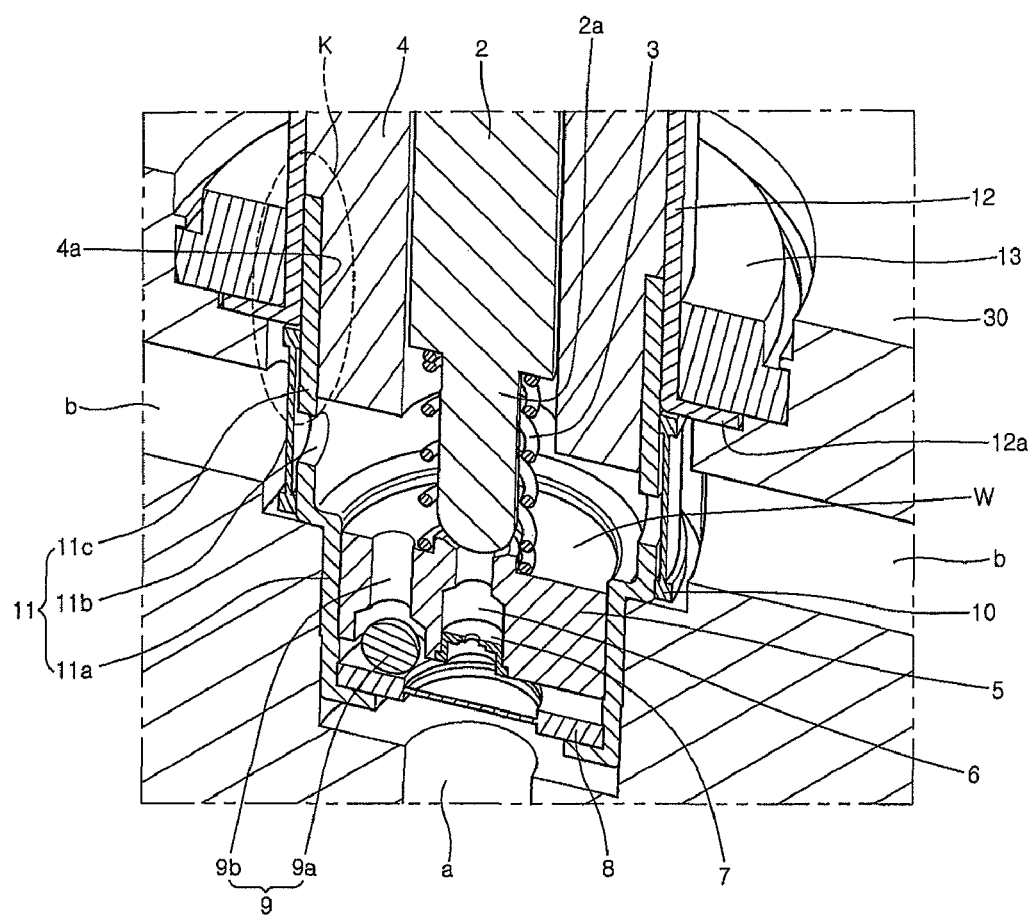
FIG. 2 is perspective view showing a pump housing of the solenoid valve having a short axis according to the invention.

Further, seat housing 11, as shown in FIG. 2, has a front end body 11a that is disposed to first channel hole a of pump housing 30 and has a bottom through hole 11d through which the oil flows inside or is discharged outside, and a rear end body 11c that has a larger diameter than front end body 11a and is fitted between valve body 4 and cover housing 12 by staking.

In addition, side through holes 11b that is communicated with second channel hole b of pump housing 30 and allows the oil to flow inside and to be discharged outside are formed through the side of rear end body 11c.

Further, seat housing 11 is provided with a circumferential filter 10 that filters impurities in the oil and circumferential filter 10 surrounds through holes 11b at the side of rear end body 11c of seat housing 11.

Seat housing 11 having the above configuration is integrally formed by pressing.

As described above, according to the solenoid valve of the invention, which is fitted in pump housing 30, when ABS/TCS/ESP operate, valve body 4 with plunger 2 that forms the internal channel with plunger seat 5 is formed in a simple cylindrical shape to reduce a cycle time and manufacturing cost while seat housing 11 that is manufactured by pressing, in which filter 8 and plunger seat 5 forming the internal channel are assembled is fitted in vale body 4 by staking. Accordingly, a laser welding is not needed and the length of the end portion of valve body 4 is reduced, such that the entire length is reduced and the weigh is reduced as well.

Therefore, according to the solenoid valve of the invention, as shown in FIG. 1, bush 13 having a large diameter D is fitted on the outer circumference of cover housing 12 that accommodates armature 1, plunger 2, and valve body 4 and cover housing 12 is fitted in pump housing 30 together bush 13, such that bush 13 generates a large fitting force with respect to pump housing 30 while bush 13 presses the flange 12a at the end of cover housing 12.

A seal ring is provided to the portion of pump housing 30 where bush 13 is disposed.

As described above, seat housing 11 is fitted in valve body 4 by staking at the fitting portion of pump housing 13 of the solenoid valve, and disposed between first and second channels a, b of pump housing 30 to form a channel between the wheel cylinder and master cylinder.

That is, as shown in FIG. 2, front end body 4a having a small diameter is formed at valve body 4 accommodated in cover housing 12 and a staking section K is formed at a predetermined gap between front end body 4a and cover housing 12 by rear end body 11c of seat housing 11 that is manufactured by pressing, such that seat housing 11 forms channel space W with respect to valve body 4 and is fitted by stacking.

In this configuration, side through holes 11b that is surrounded by circumferential filter 10 is formed at rear end body 11c of seat housing 11 and communicated with second channel hole b of pump housing 30.

Further, seat housing has front end body 11a which is integrally formed and has a smaller diameter than rear end body 11c that is fitted in valve body 4, bottom through hole 11d that is communicated with first channel hole a of pump housing 30 is formed through front end body 11a, and front end filter 8, insert 7, and plunger seat 5 are sequentially disposed in front end body 11a.

As described above, plunger seat 5 disposed in front end body 11a of seat housing 11 has channel hole 6 formed through the center, the outlet of channel hole 6 is opened or closed when the arc-shaped end of channel opening/closing valve 2a extending from plunger 2, that is, the outlet of channel hole 6 is closed by channel opening/closing valve 2a that moves to plunger seat when armature 1 is excited, and is opened by the opposite operation.

Further, return valve 9 that is provided in plunger seat 5 and helps rapid return of the oil has return channel hole 9b that is formed in parallel with channel hole 6 at a side of channel hole 6 at the center of plunger seat 5 and ball 9a that is disposed at the inlet of return channel hole 9b to open/close return channel hole 9b using hydraulic pressure that is discharged from the wheel cylinder, in which ball 9a is held and supported by front filter 8 to secure a gap such that return channel hole 9b can be opened.

As described above, according to the solenoid valve, seat housing 11 that is inserted in pump housing 30 and disposed between first and second channel holes a, b accommodates plunger seat 5 and front end filter 8 and a portion of seat housing 11 is inserted by staking to valve body 4 inserted in cover housing 12 of which an end is fitted pump housing 30 by bush 13. Therefore, the entire length is reduced as much as channel space W formed by valve body 4 and plunge seat 5, that is, as shown in FIG. 1A, as the length of valve body 4 is reduced, the maximum valve axis length L, which is the entire length of the solenoid valve, is reduced.

In the channel that is formed when the solenoid valve having the above configuration is activated, as shown in FIG. 3B, when power is supplied, channel opening/closing valve 2a of plunger 2 closes channel hole 6 of plunger seat 5 as armature is excited, and accordingly, the oil that flows into the master cylinder through first channel hole 1a of pump housing 30 is stopped by plunger seat 5 and ball 9a of return valve 9 also closes return channel hole 9b by the oil pressure.

As described above, as both internal channel and return channel of the solenoid valve are closed, a brake hydraulic pressure is generated and maintained in the wheel cylinder.

Further, when the hydraulic pressure is further applied to the wheel cylinder, as a current is not applied to the solenoid valve, as shown in FIG. 3A, channel opening/closing valve 2a is detached from plunger seat 5 together with plunger 2a by the elastic return force of spring 3 because armature 1 is not excited. Therefore, while channel hole 6 of plunger seat 5 is opened and the oil that flows from the master cylinder flows into channel space W through first channel hole a of pump housing 30 and then is supplied to the wheel cylinder through second channel hole b.

In this operation, ball 9a of return valve 9 receives the oil pressure that is transmitted from the master cylinder and closes return channel hole 9b.

Further, when the oil returns to the master cylinder, because a current is not supplied to the solenoid valve, as shown in FIG. 3C, plunger 2 is moved by the elastic return force of spring 3 and armature that is not excited. Therefore, channel opening/closing valve 2a is detached from plunger seat 5 and channel hole 6 of plunger seat 5 is opened, while the oil that returns through second channel hole b of pump housing 30 flows to first channel hole a through channel hole 6 and returns to the master cylinder, thereby releasing the braking force.

As a portion of the oil that returns through second channel hole b of pump housing 30 flows into return channel 9b of return valve of plunger seat 5 and the oil that passes through return channel hole 9b pushes ball 9a to front end filter 8, such that return channel hole 9b is opened. Accordingly, as the oil returns through channel hole 6 of plunger seat 5 and through return channel hole 9b, the braking is rapidly released.

What is claimed is:

1. A solenoid valve having a short axis, comprising:
    a valve body that pushes a spring when an armature is excited, has a center through hole where a plunger having a channel opening/closing valve extending from a front end of the plunger is inserted, and has a front body of the valve body that has an outer circumference that is stepped as compared with another portion of the valve body;
    a cover housing that is disposed inside a coil, has an outer circumference on which a bush, which surrounds the valve body and is fitted, and has a front end flange that is formed at the end and has an enlarged diameter to support the bottom of the bush;
    a seat housing that is disposed such that the plunger body with a channel hole, which is formed through the center of the plunger body to form a channel and opened/closed by a channel opening/closing valve, forms a channel space with respect to the valve body, has a front end body of the seat housing having a bottom through hole that is communicated with a first channel hole of a pump housing, and has a rear body of the seat housing that has a larger outer diameter than the front end body of the seat housing, has side through holes communicated with a second channel hole of the pumping housing, has a staking section at the end so that the seat housing is forcedly inserted in an abutment between an inner circumference of the cover housing and an outer circumference of the front body of the valve body;
    a front end filter that is disposed under a plunger seat with an insert that is fitted in an inlet of the channel hole in the front body of the seat housing to remove impurities in oil that flows inside through the bottom through hole of the front body of the seat housing;
    a return valve that is formed in parallel with the channel hole of the plunger seat at a side of the channel hole and forms a return channel between the first channel hole and the second channel hole of the pump housing as being opened by pressure of the oil that returns from a wheel cylinder; and
    a circumferential filter that surrounds the side through holes of the rear body of the seat housing and filters impurities in the oil.

2. The solenoid valve as defined in claim 1, wherein the end of the channel opening/closing valve of the plunger and the outlet of the channel hole of the plunger seat have arch shapes that correspond to each other.

3. The solenoid valve as defined in claim 1, wherein the front end filter supports a net formed at the center and has an edge having a predetermined width.

4. The solenoid valve as defined in claim 1, wherein the front end flange of the cover housing has a smaller diameter than the diameter of the bush.

5. The solenoid valve as defined in claim 1, wherein the return valve has a return channel hole that is formed in parallel with the channel hole of the plunger seat at a side of the channel hole and a ball that is disposed at the outlet of the return channel hole and opens/closes the return channel hole by the hydraulic pressure transmitted through the return channel hole.

6. The solenoid valve as defined in claim 5, wherein the ball is held and supported by the front filter to secure a gap such that the return channel hole can be opened.

* * * * *